US012780145B2

(12) United States Patent
Yeung et al.

(10) Patent No.: US 12,780,145 B2
(45) Date of Patent: Nov. 3, 2026

(54) SYSTEMS AND METHODS FOR VEHICLE ACCESS AND REMOTE CONTROL

(71) Applicant: Rivian IP Holdings, LLC, Irvine, CA (US)

(72) Inventors: Fai Yeung, Palo Alto, CA (US); Sreenivasulu Gosangi, San Ramon, CA (US); Aatif Hasan Shah, East Palo Alto, CA (US); Geoffrey Francis Burns, Palo Alto, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 38 days.

(21) Appl. No.: 18/535,969

(22) Filed: Dec. 11, 2023

(65) Prior Publication Data

US 2025/0187561 A1 Jun. 12, 2025

(51) Int. Cl.

*B60R 25/20* (2013.01)
*B60R 25/01* (2013.01)
*B60R 25/24* (2013.01)
*B60R 25/30* (2013.01)
*G06F 3/01* (2006.01)
*H04B 17/318* (2015.01)

(52) U.S. Cl.

CPC .......... *B60R 25/2045* (2013.01); *B60R 25/01* (2013.01); *B60R 25/245* (2013.01); *B60R 25/305* (2013.01); *G06F 3/016* (2013.01); *G06F 3/017* (2013.01); *H04B 17/318* (2015.01); *B60R 2325/101* (2013.01)

(58) Field of Classification Search

CPC ... B60R 25/2045; B60R 25/01; B60R 25/245; B60R 25/305; B60R 2325/101; H04B 17/318; G06F 3/016; G06F 3/017

See application file for complete search history.

(56) References Cited

U.S. PATENT DOCUMENTS

| | | | | |
|---|---|---|---|---|
| 9,499,125 | B2 * | 11/2016 | Akay | B60R 25/01 |
| 9,646,436 | B1 * | 5/2017 | Campbell | G07C 9/00309 |
| 9,721,408 | B2 | 8/2017 | Obata et al. | |
| 10,124,768 | B1 * | 11/2018 | Bocca | B60R 25/24 |
| 10,179,568 | B2 * | 1/2019 | Hariri | B60R 25/245 |
| 11,524,656 | B2 * | 12/2022 | Yorke | B60R 25/24 |
| 2015/0081167 | A1 * | 3/2015 | Pisz | B60K 35/10 715/771 |
| 2015/0254913 | A1 | 9/2015 | Obata et al. | |
| 2016/0103499 | A1 * | 4/2016 | Yamamoto | G06F 3/04883 345/156 |
| 2019/0171218 | A1 * | 6/2019 | Hammond | B60W 30/09 |
| 2020/0183383 | A1 * | 6/2020 | Stent | B60W 40/08 |
| 2021/0264691 | A1 * | 8/2021 | Hirao | H04W 64/006 |

(Continued)

*Primary Examiner* — Thomas D Alunkal

(74) *Attorney, Agent, or Firm* — Patterson + Sheridan, LLP

(57) ABSTRACT

Systems and methods for vehicle access and remote control are provided. One method may include establishing a wireless communication link with a wireless vehicle access system (VAS) device, authenticating the wireless VAS device, recognizing a hand gesture password performed by a user of the authenticated wireless VAS device, authenticating the hand gesture password based on a user profile associated with the authenticated wireless VAS device, recognizing a hand gesture command performed by the user of the authenticated wireless VAS device, and executing a vehicle control command associated with the hand gesture command.

20 Claims, 6 Drawing Sheets

(56) References Cited

U.S. PATENT DOCUMENTS

| | | | | |
|---|---|---|---|---|
| 2021/0339704 | A1* | 11/2021 | Rathi | B60R 25/20 |
| 2022/0219644 | A1 | 7/2022 | Tong et al. | |
| 2023/0111327 | A1* | 4/2023 | Ling | B60R 25/1003<br>345/633 |
| 2024/0280984 | A1* | 8/2024 | Buttolo | B60W 30/06 |

* cited by examiner

SYSTEMS AND METHODS FOR VEHICLE ACCESS AND REMOTE CONTROL

INTRODUCTION

The present disclosure relates to vehicles. More particularly, the present disclosure relates to vehicle access and remote control.

SUMMARY

Embodiments of the present disclosure advantageously provide systems and methods for vehicle access and remote control.

In certain embodiments, a method for vehicle access and remote control may include establishing a wireless communication link with a wireless vehicle access system (VAS) device, authenticating the wireless VAS device, recognizing a hand gesture password performed by a user of the authenticated wireless VAS device, authenticating the hand gesture password based on a user profile associated with the authenticated wireless VAS device, recognizing a hand gesture command performed by the user of the authenticated wireless VAS device, and executing a vehicle control command associated with the hand gesture command.

DETAILED DESCRIPTION

Figure 1:
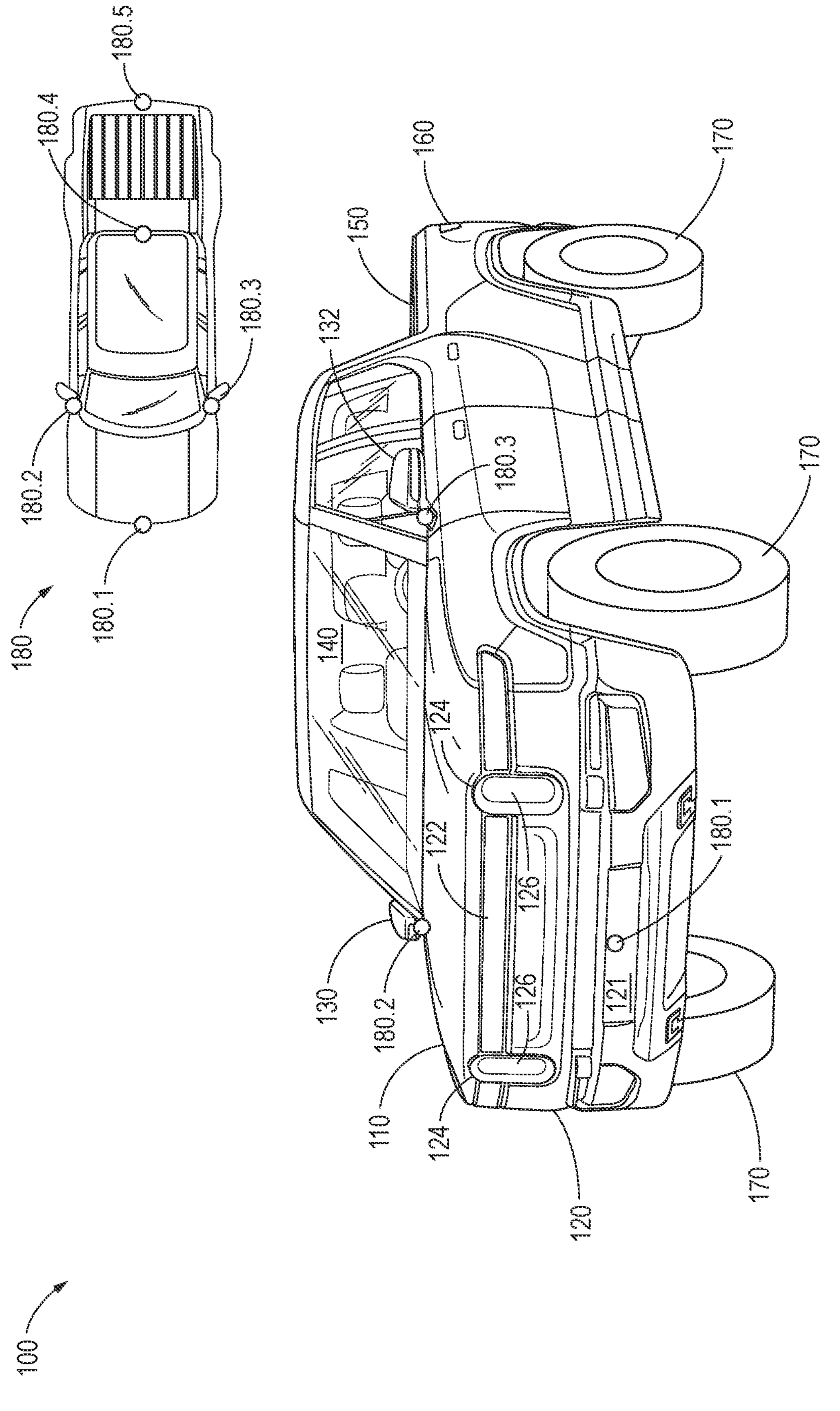
FIG. 1 depicts a diagram of an example vehicle, in accordance with embodiments of the present disclosure.

Vehicle manufacturers may provide vehicle access and remote control commands using different types of wireless devices, such as bracelets, key fobs, smartwatches, smartphones, etc. These wireless vehicle access system (VAS) devices typically communicate with the vehicle control system using Bluetooth Low Energy (LE) or Ultra Wide Band (UWB) technologies.

Unfortunately, bracelets are limited to passive vehicle entry functions, such locking and unlocking the doors. While key fobs add some basic functionality to passive vehicle entry functions, such as setting off the vehicle alarm or opening the trunk, neither bracelets nor key fobs are able to provide a more advanced suite of vehicle access and remote control commands due to, inter alia, user interface (UI) limitations, such as a lack of available space on the wireless VAS device for additional UI controls (such as mechanical buttons, capacitive sensing buttons, etc.), as well as other limitations. Smartwatches and smartphones provide more capability than bracelets and key fobs. However, smartwatches and smartphones require the user to run a mobile application and interact with a graphical user interface (GUI) displayed on a touchscreen to access vehicle control commands, which is inconvenient and burdensome, particularly when one or both of the user's hands are full or otherwise occupied when approaching the vehicle.

Embodiments of the present disclosure advantageously provide systems and methods for vehicle access and remote control that is secure, customizable for individual users, robust, and produces fewer false positives and false negatives. More particularly, certain embodiments herein provide a computer vision (CV) approach that provides advanced vehicle access and remote control commands using existing vehicle cameras and wireless VAS devices without the need for additional UI mechanical controls or the use of mobile applications with GUIs.

Embodiments of the present disclosure combine standard wireless VAS device authentication with a secure user identification process that includes recognition of a hand gesture password to unlock advanced remote control commands that are invoked by additional hand gestures from the user. Because multiple users may use a single wireless VAS device, the hand gesture password includes a unique sequence of hand gestures to identify the current user of the wireless VAS device. In certain embodiments, the mapping of hand gestures to remote control commands may be the same for every user of a wireless VAS device. In other embodiments, the secure user identification process may access a user profile in which hand gestures are mapped to vehicle control commands based on the user's preference. Generally, a different hand gesture, or a different sequence of hand gestures, may be mapped to each remote control command.

While embodiments of the present disclosure are presented with respect to an electric vehicle, the present disclosure is not limited to electric vehicles and may be incorporated into any combustion engine vehicle.

FIG. 1 depicts a diagram of vehicle 100, in accordance with embodiments of the present disclosure.

Vehicle 100 includes, inter alia, a frame and body 110, an electrical power storage and distribution system, a propulsion system, a suspension system, a steering system, auxiliary and accessory systems (such as thermal management, lighting, wireless communications, navigation, cameras, etc.), etc.

Generally, body 110 may be directly or indirectly mounted to a frame (i.e., body-on-frame construction), or body 110 may be formed integrally with a frame (i.e., unibody construction). Body 110 includes, inter alia, front end 120, front bumper 121, front light bar 122, front turn lights, stadium light rings 124, headlights 126, right side mirror 130, left side mirror 132, driver/passenger compartment or cabin 140 with a center high-mounted stop light (CHMSL), bed 150, rear end 160 with rear tail lights, a rear light bar, etc., wheels 170, etc. Vehicle 100 may be a pickup truck, a sport utility vehicle (SUV) in which bed 150 is replaced by an extension of cabin 140, or a sedan in which bed 150 is replaced by a trunk. In certain embodiments, vehicle may be a delivery vehicle, a cargo van, etc.

The auxiliary and accessory systems may include cameras 180 that are arranged to provide a comprehensive view of the environment surrounding vehicle 100, such as front (facing) camera 180.1 located in front bumper 121, right side (facing) camera 180.2 located in right side mirror 130, left side (facing) camera 180.2 located in left side mirror 132, rear (facing) camera 180.4 located in or near the CHMSL, and rear (facing) camera 180.5 located above the rear license plate in rear end 160. Additional cameras may also be incorporated.

Figure 2:
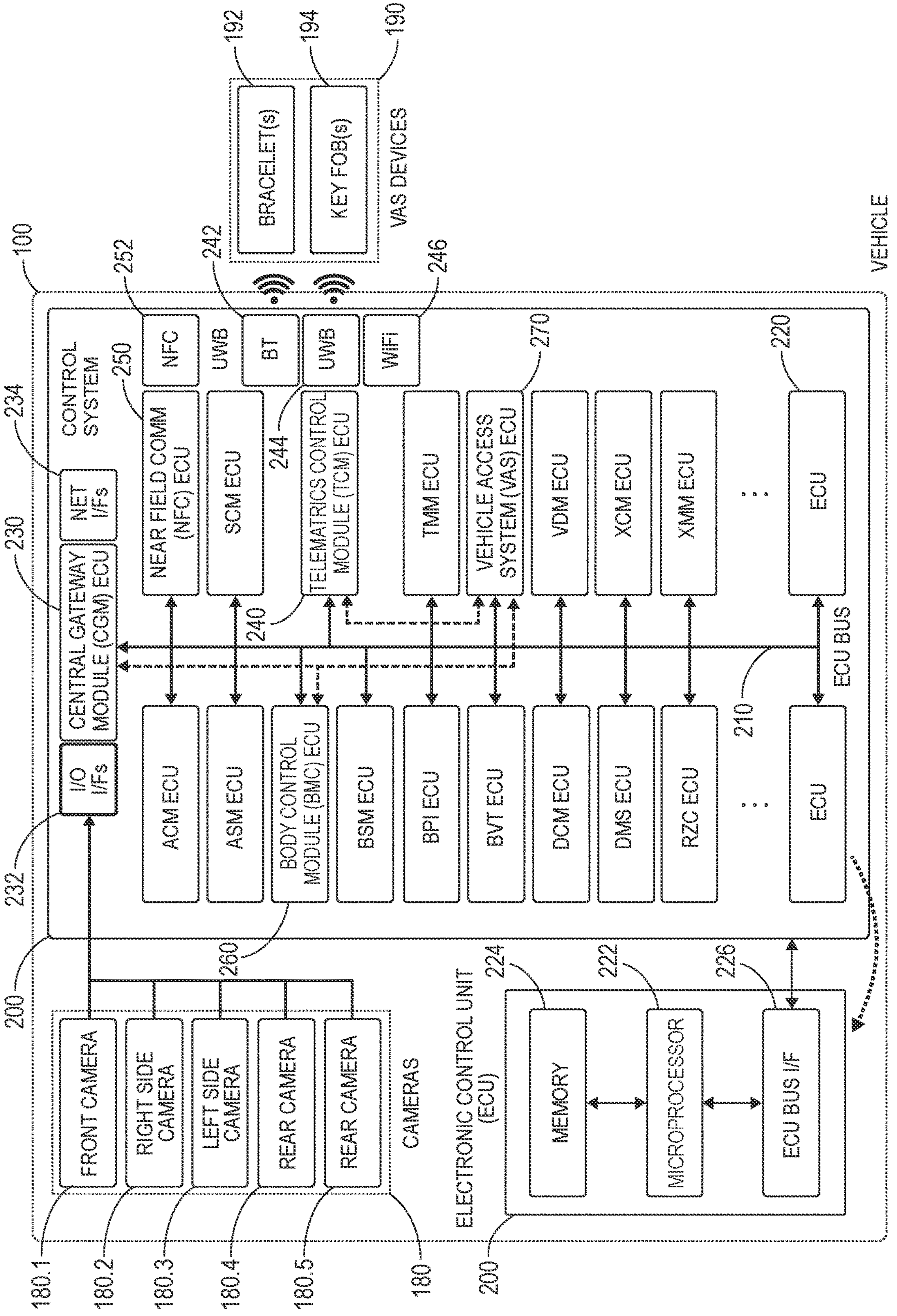
FIG. 2 presents a block diagram of example components of a vehicle, in accordance with embodiments of the present disclosure.

FIG. 2 presents a block diagram of example components of vehicle 100, in accordance with embodiments of the present disclosure.

Generally, vehicle 100 includes control system 200 that is configured to perform the functions necessary to operate vehicle 100. In certain embodiments, control system 200 includes a number of ECUs 220 coupled to ECU bus 210 (also known as a controller area network or CAN). Each ECU 220 performs a particular set of functions, and includes, inter alia, microprocessor 222 coupled to memory 224 and ECU bus interface (I/F) 226.

In certain embodiments, control system 200 may include a number of system-on-chips (SoCs). Each SoC may include a number of multi-core processors coupled to a high-speed interconnect and on-chip memory that provide more robust functionality and performance than a single ECU 220. Accordingly, each SoC may combine the functionality provided by several ECUs 220.

Control system 200 may be coupled to sensors (such as cameras 180, radar sensors, ultrasonic sensors, etc.), actuators (such as electric, hydraulic, pneumatic, etc.), input/output (I/O) devices, as well as other components within the propulsion system, the electrical power storage and distribution system, the suspension system, the steering system, the auxiliary and accessory systems, etc.

Control system 200 may include central gateway module (CGM) ECU 230, which provides a central communications hub for vehicle 100. CGM ECU 230 includes (or is coupled to) I/O interfaces (I/Fs) 232 to receive data from, and send commands to, various vehicle components, such as cameras 180, radar sensors, ultrasonic sensors, actuators, input devices, output devices, etc. CGM ECU 230 also includes (or is coupled to) network interfaces (I/Fs) 234 to provide network connectivity through ECU bus ports, local interconnect network (LIN) ports, Ethernet ports, etc.

CGM ECU 230 may route messages (including data, commands, etc.) over ECU bus 210 from one ECU 220 to another ECU 220, or from one ECU 220 to multiple ECUs 220 (such as broadcast messages, etc.). In one example, CGM ECU 230 may receive a message from a source ECU 220, process the message to determine, inter alia, the destination ECU 220, and then transmit the message to the destination ECU 220. In another example, CGM ECU 230 may simply arbitrate ECU bus 210 to allow the source ECU 220 to send a message directly to the destination ECU 220.

CGM ECU 230 may receive data from one or more sensors (such as cameras 180, etc.), an I/O device, a vehicle component, etc., and then send a message containing the data to the appropriate ECU 220 over ECU bus 210. Similarly, CGM ECU 230 may receive a message containing data or a command from a source ECU 220, and then send the data or command to the appropriate actuator, I/O device, vehicle component, etc. Additionally, CGM ECU 230 may manage the vehicle mode (such as road driving mode, off-roading mode, tow mode, camping mode, parked mode, etc.), and may control certain vehicle components related to transitioning from one vehicle mode to another vehicle mode.

Control system 200 may include telematics control module (TCM) ECU 240, which provides a wireless communications hub for vehicle 100. TCM ECU 240 may include (or be coupled to) one or more wireless transceivers, such as Bluetooth (BT) transceiver 242, ultra wide band (UWB) transceiver 244, WiFi transceiver 246, etc. Bluetooth transceiver 242 may support both Bluetooth LE radio as well as Bluetooth Classic radio (i.e., Bluetooth Basic Rate/Enhanced Data Rate), which are collectively referred to as "Bluetooth" or "BT" hereinafter. Additionally, control system 200 may also include near-field communication (NFC) ECU 250, which provides an NFC communications hub for vehicle 100 and may include (or be coupled to) NFC transceiver 252, such as an RFID transceiver, etc.

Wireless VAS devices 190 may include different types of wireless devices, such as bracelet(s) 192, key fob(s) 194, smartwatches, smartphones, etc. Generally, a wireless VAS device 190 includes, inter alia, a processor, a controller, an FPGA, an ASIC, etc., memory, and a wireless transmitter or transceiver such as a BT transmitter or transceiver, a UWB transmitter or transceiver, an NFC (or RFID) transmitter or transceiver, etc.

Figure 4:
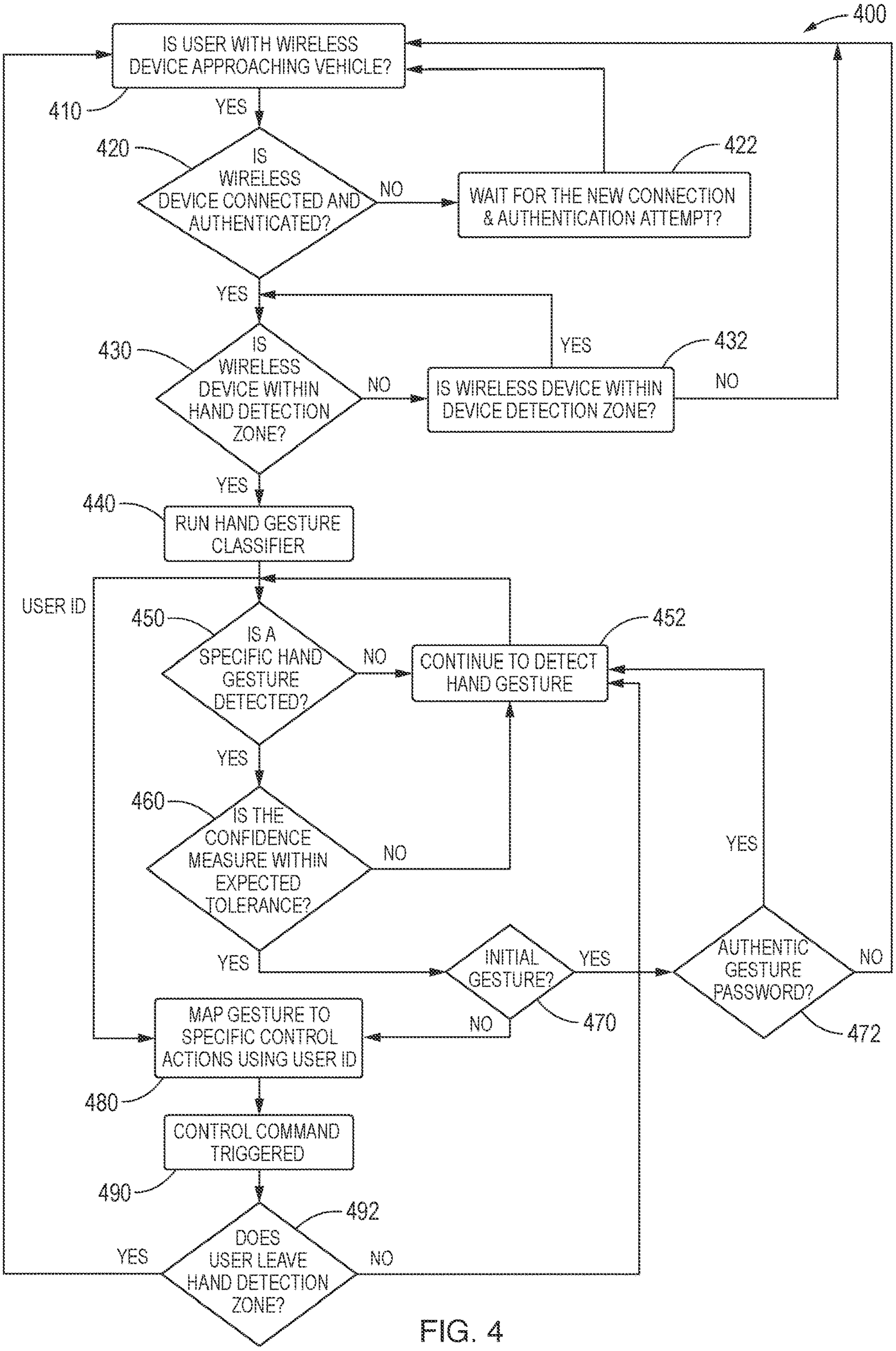
FIG. 4 depicts a flow chart representing functionality associated with vehicle access and remote control, in accordance with embodiments of the present disclosure.

In certain embodiments, TCM ECU 240 may establish a communication link with a wireless VAS device 190 when the wireless VAS device 190 enters a device detection zone (DDZ) from a device undetectable zone (DUZ), as depicted in FIG. 4 (and discussed below). In other embodiments, NFC ECU 250 may establish the communication link with the wireless VAS device 190, and the functionality described below with respect to TCM ECU 240 may be performed by NFC ECU 250.

Control system 200 may include body control module (BCM) ECU 260, which may be coupled directly or indirectly (through one or more ECUs 220) to various actuators and components of vehicle 100, such as suspension components, cabin lights, cabin heating ventilation and air conditioning (HVAC) system components, exterior lights, door locks, trunk locks, etc. For electric vehicles, BCM ECU 260 may be coupled directly or indirectly to various components of the thermal management system (TMS), the frunk lock, etc., while for combustion engine vehicles, BCM ECU 260 may be coupled directly or indirectly to various components of the combustion engine propulsion system, etc.

Control system 200 may include vehicle access system (VAS) ECU 270, which provides, inter alia, authentication of wireless VAS devices 190, processing of remote control commands from wireless VAS devices 190 (such as door lock and unlock commands, remote engine start commands for combustion engines, and security system panic commands), vehicle security system control and/or implementation, etc. Generally, VAS ECU 270 may be configured to receive data over ECU bus 210, such as wireless VAS device data from TCM ECU 240, camera image data from CGM ECU 230, etc., as well as to send commands over ECU bus 210 to other ECUs 220, such as a suspension height command to BCM ECU 260, an open funk command to BCM ECU 260, etc.

In certain embodiments, control system 200 may also include, inter alia, autonomy control module (ACM) ECU, autonomous safety module (ASM) ECU, battery management system (BMS) ECU, battery power isolation (BPI) ECU, balancing voltage temperature (BVT) ECU, door control module (DCM) ECU, driver monitoring system (DMS) ECU, rear zone control (RZC) ECU, seat control module (SCM) ECU, thermal management module (TMM) ECU, winch control module (WCM) ECU, experience management module (XMM) ECU, etc. Combustion engine vehicles may have a somewhat different suite of ECUs 220.

Figure 3:
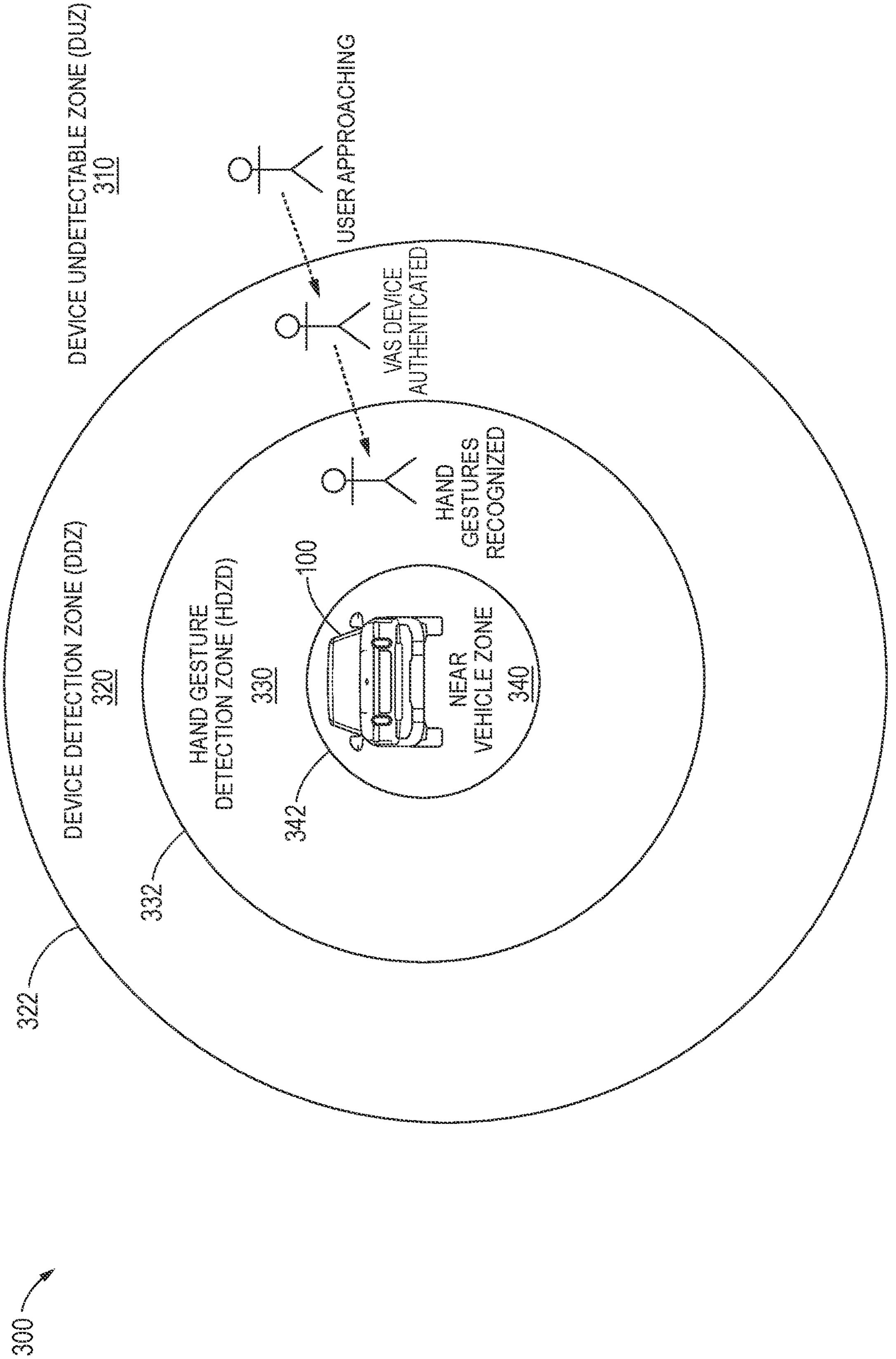
FIG. 3 depicts a diagram of exemplary zones surrounding a vehicle, in accordance with embodiments of the present disclosure.

FIG. 3 depicts diagram 300 of exemplary zones surrounding a vehicle, in accordance with embodiments of the present disclosure.

In certain embodiments, the environment surrounding vehicle 100 may be divided into four zones based on distance from vehicle 100, including device undetectable zone (DUZ) 310, device detection zone (DDZ) 320, hand gesture detection zone (HGDZ) 330, and near vehicle zone (NVZ) 340. DDZ 320 includes outer threshold 322, HGDZ 330 includes outer threshold 332, and NVZ 340 includes outer threshold 342. In other words, NVZ 340 immediately surrounds vehicle 100, HGDZ 330 surrounds NVZ 340, and DDZ 320 surrounds HGDZ 330.

Generally, a user with a wireless VAS device 190 approaches vehicle 100 through DUZ 310. At some distance from vehicle 100, TCM ECU 240 may begin to receive a wireless signal transmitted from the wireless VAS device 190. When the wireless signal strength reaches a wireless signal detection threshold, outer threshold 322 for DDZ 320 has been reached, and TCM ECU 240 may establish a communication link with the wireless VAS device 190.

After the communication link is established, wireless VAS device 190 transmits authentication data to TCM ECU 240, which sends the authentication data to VAS ECU 270. VAS ECU 270 then authenticates the wireless VAS device 190 based on the authentication data and an associated security protocol, such as public key infrastructure (PKI), etc. The distance from the wireless VAS device 190 to the vehicle may be determined based on certain characteristics of the communication link, such as RSSI (Received Signal Strength Indicator) for Bluetooth, signal ToF (Time-of-Flight) for UWB, etc.

As the user continues to approach vehicle 100 through DDZ 320, VAS ECU 270 may determine that outer threshold 332 for HGDZ 330 has been reached. VAS ECU 270 may send a request to CGM ECU 230 to forward image data from cameras 180 to VAS ECU 270 in order to identify which camera is viewing the user. Once VAS ECU 270 identifies the camera using basic image recognition techniques, VAS ECU 270 may send another request to CGM ECU 230 to send only the image data from the identified camera to VAS ECU 270 for more-detailed image recognition purposes, such as hand gesture recognition, facial recognition, etc. VAS ECU 270 may send a request to CGM ECU 230 to forward image data from cameras 180 when the user is located in DDZ 320, or when the user reaches outer threshold 332 for HGDZ 330.

More particularly, the camera image data may be a time sequence of images (such as video data with a particular frame rate, resolution and color depth; downsampled video data; etc.), and VAS ECU 270 may perform image recognition using a machine learning (ML) model, such as an artificial neural network (ANN), a deep neural network (DNN), a convolutional neural network (CNN), a recursive neural network (RNN), etc. In certain embodiments, the ML model may be a K-Nearest Neighbor (KNN) model in which the classification of a data point is determined by the classification of the neighboring data point(s). Additionally, the ML model may be trained with a bias with respect to hand size at a specified distance zone from vehicle 100, such as within HGDZ 330, to deliver better results.

The user may pause or continue to approach vehicle 100 while articulating a hand gesture password with one or both hands. VAS ECU 270 recognizes the hand gesture password in the camera image data, and then authenticates the hand gesture password based on a user profile associated with the wireless VAS device 190. Once authenticated, the user may pause or continue to approach vehicle 100 while articulating a hand gesture command with one or both hands. VAS ECU 270 recognizes the hand gesture command in the camera image data, and then determines the associated vehicle control command based on the user profile. After the vehicle control command is determined, VAS ECU 270 sends a command to the appropriate ECU 220 to execute the vehicle control command, such as a suspension command to BCM ECU 260 to lower the vehicle height for ease of cabin entry, an open frunk command to BCM ECU 260 to open the frunk, etc.

In certain embodiments, RSSI or ToF information may be used to support a look-ahead feature to hand gesture recognition so that previewing snapshots of hand gestures may be measured at a regular distance interval in DDZ 320. Based on the availability of look-ahead hand gesture estimates, the variability of hand gesture estimates may be determined to lower the rate of false positives for vehicle control commands that are triggered by hand gesture estimates.

In certain embodiments, further hand gesture recognition may not be possible after the user reaches outer threshold 342 of NVZ 340 due to the proximity of the user to the identified camera.

FIG. 4 depicts flow chart 400 representing functionality associated with vehicle access and remote control, in accordance with embodiments of the present disclosure.

In certain embodiments, the functionality associated with vehicle access and remote control may include functional blocks 410, 420, 422, 430, 432, 440, 450, 452, 460, 470, 472, 480, 490, and 492. In other embodiments, these functional blocks may be arranged in a different order, certain functional blocks may be omitted, other functional blocks may be added, etc.

At 410, control system 200 determines whether a user with a wireless VAS device 190 is approaching vehicle 100. For example, BT transceiver 242 may receive a Bluetooth signal transmitted by the wireless VAS device 190 and determine an RSSI value associated with the Bluetooth signal, and then TCM ECU 240 may evaluate the RSSI value. When the RSSI value is greater than or equal to an RSSI detection threshold, the user has crossed over outer threshold 322 from DUZ 310 to DDZ 320. For another example, UWB transceiver 244 may receive a UWB signal transmitted by the wireless VAS device 190 and determine a ToF measurement value associated with the UWB signal, and then TCM ECU 240 may determine the ToF distance based on the ToF measurement value and the speed of light (such as ToF measurement value·c/2). When the ToF distance is less than or equal to a ToF detection threshold, the user has crossed over outer threshold 322 from DUZ 310 to DDZ 320. Flow then proceeds to 420.

At 420, control system 200 attempts to connect to, and then authenticate, wireless VAS device 190. For example, TCM ECU 240 may attempt to establish a communication link with the wireless VAS device 190, such as a Bluetooth communication link, a UWB communication link, etc.

If the communication link is established, then the wireless VAS device 190 sends authentication data to TCM ECU 240, which forwards the authentication data to VAS ECU 270. In response, VAS ECU 270 authenticates the wireless VAS device 190 based on the authentication data and an associated security protocol, such as public key infrastructure (PKI), etc. If the wireless VAS device 190 is authenticated, flow proceeds to 430. However, if TCM ECU 240 cannot establish a communication link with the wireless VAS device 190, or if VAS ECU 270 cannot authenticate the wireless VAS device 190, flow proceeds to 422.

At 422, control system 200 waits for a new attempt to connect to, and then authenticate, wireless VAS device 190. For example, TCM ECU 240 may wait until the Bluetooth RSSI value falls below the RSSI detection threshold (indicating that the user has moved away from vehicle 100 and into DUZ 310), and then return to 410. For another example, TCM ECU 240 may wait until the ToF distance is greater than the ToF detection threshold (indicating that the user has moved away from vehicle 100 and into DUZ 310), and then return to 410.

At 430, control system 200 determines whether the user with the authenticated VAS device 190 has crossed over outer threshold 332 from DDZ 320 to HGDZ 330. For example, VAS ECU 270 may determine whether the Bluetooth RSSI value is greater than an RSSI recognition threshold, whether the ToF distance is less than or equal to a ToF recognition threshold, etc. If so, flow proceeds to 440. Otherwise, flow proceeds to 432.

At 432, control system 200 determines whether the user with the authenticated VAS device 190 remains within DDZ 320. For example, TCM ECU 240 may determine whether the Bluetooth RRSI value remains above the RSSI detection threshold, whether the ToF distance remains below the ToF detection threshold, etc. If so, flow proceeds back to 430, and VAS ECU 270 continues to monitor the RSSI values from TCM ECU 240. If not, then the user has crossed over outer threshold 322 in the other direction, i.e., from DDZ 320 to DUZ 310, and flow proceeds back to 410.

At 440, VAS ECU 270 may send a request to CGM ECU 230 to forward image data from cameras 180 to VAS ECU 270 in order to identify which camera is viewing the user (as discussed above). Once VAS ECU 270 identifies the camera using basic image recognition techniques, VAS ECU 270 may send another request to CGM ECU 230 to send only the image data from the identified camera to VAS ECU 270 for detailed image recognition purposes, such as hand gesture recognition, facial recognition, etc.

The user may pause or continue to approach vehicle 100 while articulating a hand gesture password with one or both hands. VAS ECU 270 performs hand gesture recognition (or classification) using a machine learning (ML) model (such as an RNN, etc.) on the camera image data, and flow continues to 450. Advantageously, the location of the hand gestures in the image frame of the camera image data may be aligned with the estimated location of the user and the wireless VAS device 190 in HGDZ 330. Additionally, multiple location estimates may be used to evaluate the consistency of the distance measurements, and to confirm that the wireless VAS device 190 is carried (worn, etc.) by the same user that is articulating the hand gesture that is being recognized.

At 450, VAS ECU 270 determines whether a hand gesture was recognized. If so, flow proceeds to 460. If not, flow proceeds to 452.

At 452, VAS ECU 270 continues to perform hand gesture recognition on the camera image data, and flow proceeds to 450.

At 460, VAS ECU 270 compares a confidence measure value associated with the hand gesture recognition result to an expected tolerance value. If the confidence measure value is equal to or greater than the expected tolerance value, flow continues to 470. If not, flow proceeds to 452. The confidence measure value may express the probability (such as a percentage) that the hand gesture was recognized (or detected) correctly, and may be output by the ML model with the hand gesture recognition result. The expected tolerance value may also expressed as a probability (such as a percentage).

Figure 5A:
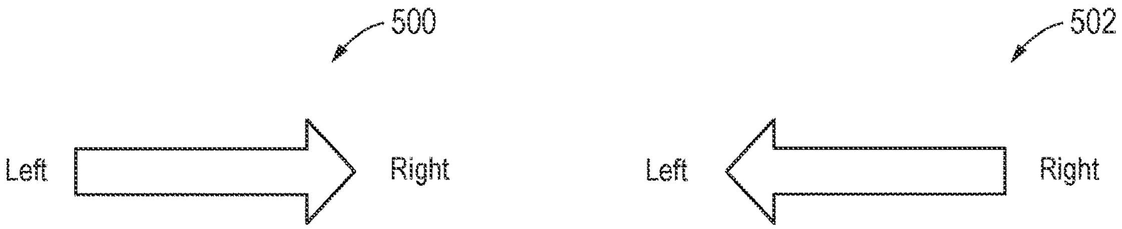
FIGS. 5A, 5B, 5C depict example hand gestures, in accordance with embodiments of the present disclosure.
Figure 5B:
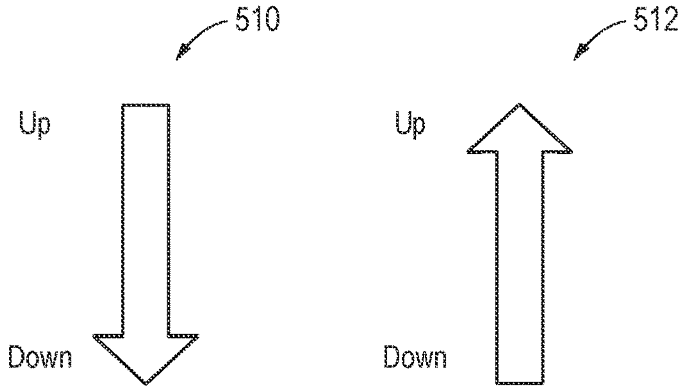
Figure 5C:
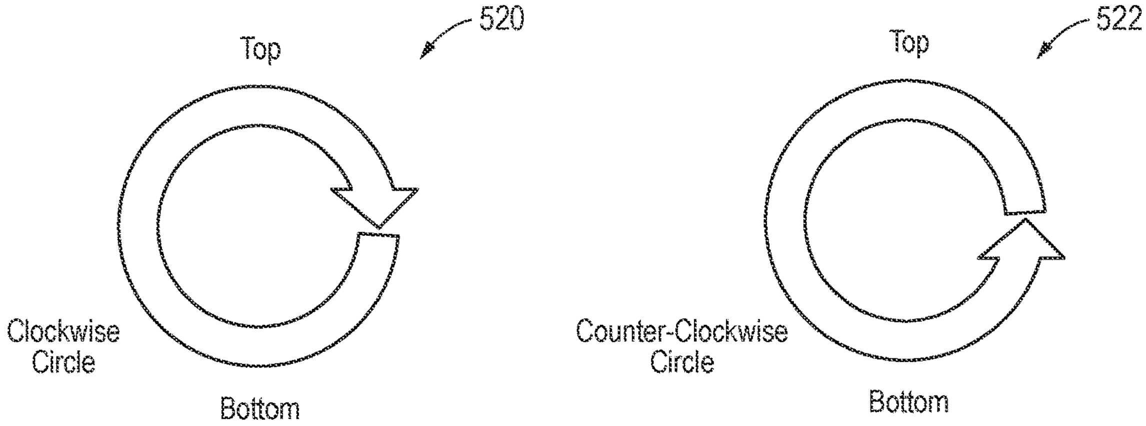

FIGS. 5A, 5B, 5C depict example hand gestures, in accordance with embodiments of the present disclosure.

FIG. 5A depicts "Left-Right" hand gesture 500 and "Right-Left" hand gesture 502, in accordance with embodiments of the present disclosure.

For example, the hand gesture recognition result may be a left-hand "Left-Right" gesture with a confidence measure value of 90%, and the expected tolerance value for a left-hand "Left-Right" gesture may be 80%. In this example, the confidence measure value is equal to or greater than the expected tolerance value, so the hand gesture was recognized successfully. Other similar examples include a right-hand "Left-Right" gesture, a left-hand "Right-Left" gesture, and a right-hand "Right-Left" gesture.

FIG. 5B depicts "Up-Down" hand gesture 510 and "Down-Up" hand gesture 512, in accordance with embodiments of the present disclosure.

For another example, the hand gesture recognition result may be a left-hand "Up-Down" gesture with a confidence measure value of 95%, and the expected tolerance value for a left-hand "Up-Down" gesture may be 85%. In this example, the confidence measure value is equal to or greater than the expected tolerance value, so the hand gesture was recognized successfully. Other similar examples include a right-hand "Up-Down" gesture, a left-hand "Down-Up" gesture, and a right-hand "Down-Up" gesture.

FIG. 5C depicts "Clockwise Circle" hand gesture 520 and "Counter-Clockwise Circle" hand gesture 522, in accordance with embodiments of the present disclosure.

For a further example, the hand gesture recognition result may be a right-hand "Clockwise Circle" gesture with a confidence measure value of 95%. The expected tolerance value for a right-hand "Clockwise Circle" gesture may be 90%. In this example, the confidence measure value is equal to or greater than the expected tolerance value, so the hand gesture was recognized successfully. Other similar examples include a right-hand "Clockwise Circle" gesture, a left-hand "Counter-Clockwise Circle" gesture, and a right-hand "Counter-Clockwise Circle" gesture.

While FIGS. 5A, 5B, 5C present several basic hand gestures, many other hand gestures are also supported by embodiments of the present disclosure. In certain embodiments, the expected tolerance value may be the same for all hand gestures, such as 90%, 85%, 75%, 70%, etc.

Importantly, two or more hand gestures may be combined by the user and recognized as a combined hand gesture by VAS ECU 270. These combined hand gestures may be articulated by the user's left-hand, the user's right-hand, or both of the user's hands (separately or together) in various sequences.

For example, the hand gesture recognition result may be a combination of a right-hand "Clockwise Circle" gesture followed by a right-hand "Counter-Clockwise Circle" gesture with a confidence measure value of 90%. The expected tolerance value for this combined gesture may be 80%. In this example, the confidence measure value is equal to or greater than the expected tolerance value, so the hand gesture was recognized successfully. In other words, the combination or sequence of hand gestures includes two circles sequentially formed in opposite directions.

Referring back to FIG. 4, at 470, VAS ECU 270 determines whether the successfully-recognized hand gesture was the initial hand gesture that was recognized by the ML model after the user and the wireless VAS device 190 entered HGDZ 330. If so, then the successfully-recognized hand gesture is a hand gesture password, and flow proceeds to 472. If not, then the successfully-recognized hand gesture is a hand gesture command, and flow proceeds to 480.

At 472, VAS ECU 270 authenticates the successfully-recognized hand gesture password based on a user profile associated with the wireless VAS device 190. For example, the authentication data may include (or be associated with) a user ID, which is stored in the user profile in VAS ECU 270 memory with an associated hand gesture password. In certain embodiments, the associated hand gesture password is stored as a PIN value (personal identification number), and the successfully-recognized hand gesture password is converted to a PIN number and then compared to the user's PIN value stored in the user profile. The successfully-recognized hand gesture password is authenticated when the PIN value matches the PIN number. In other embodiments, the associated hand gesture password may be stored as a text string, and the successfully-recognized hand gesture password is compared to the text string for authentication. If the successfully-recognized hand gesture password is authenticated, flow proceeds to 452. If not, then flow proceeds to 410, which resets the process.

In certain embodiments, the authentication data may be associated with two or more user IDs, and each user ID may have a separate user profile stored in VAS ECU 270 memory with facial recognition data, hand gesture passwords, etc. Facial recognition techniques may be used to determine which user ID profile should be accessed for authentication of the hand gesture password. In other words, more than one user may use with a single wireless VAS device, and each user may have a separate user profile that is accessed using facial recognition.

In certain embodiments, when the successfully-recognized hand gesture password is authenticated, VAS ECU 270 may generate and send a haptic command to TCM ECU 240 for transmission to wireless VAS device 190. The haptic command may be a vibration command having a particular haptic signature, such as frequency, duration, amplitude, etc.

Additionally, when the successfully-recognized hand gesture is a hand gesture command, VAS ECU 270 may generate and send a different haptic command to TCM ECU 240 for transmission to wireless VAS device 190. The different haptic command may be a vibration command having a different haptic signature than the haptic command for the hand gesture password, such as a different frequency, a different duration, a different amplitude, etc.

At 480, the successfully-recognized hand gesture is a hand gesture command, and VAS ECU 270 may determine which vehicle control command is associated with the hand gesture command by searching the user profile based on the user ID. In addition to the user's PIN value, the user profile stores matching pairs of hand gesture commands and vehicle control commands.

After the vehicle control command is determined from the user profile, VAS ECU 270 sends a command to the appropriate ECU 220 to execute the vehicle control command, such as a suspension command to BCM ECU 260 to lower the vehicle height for ease of cabin entry, an open frunk command to BCM ECU 260 to open the frunk, etc. Flow then proceeds to 490.

At 490, the appropriate ECU 220 executes the vehicle control command. Flow proceeds to 492.

At 492, VAS ECU 270 determines whether the RRSI value remains above the RSSI detection threshold. If so, flow proceeds back to 452. If not, then the user has crossed over outer threshold 332 in the other direction, i.e., from HGDZ 330 to DDZ 320, and flow proceeds back to 410.

Figure 6:
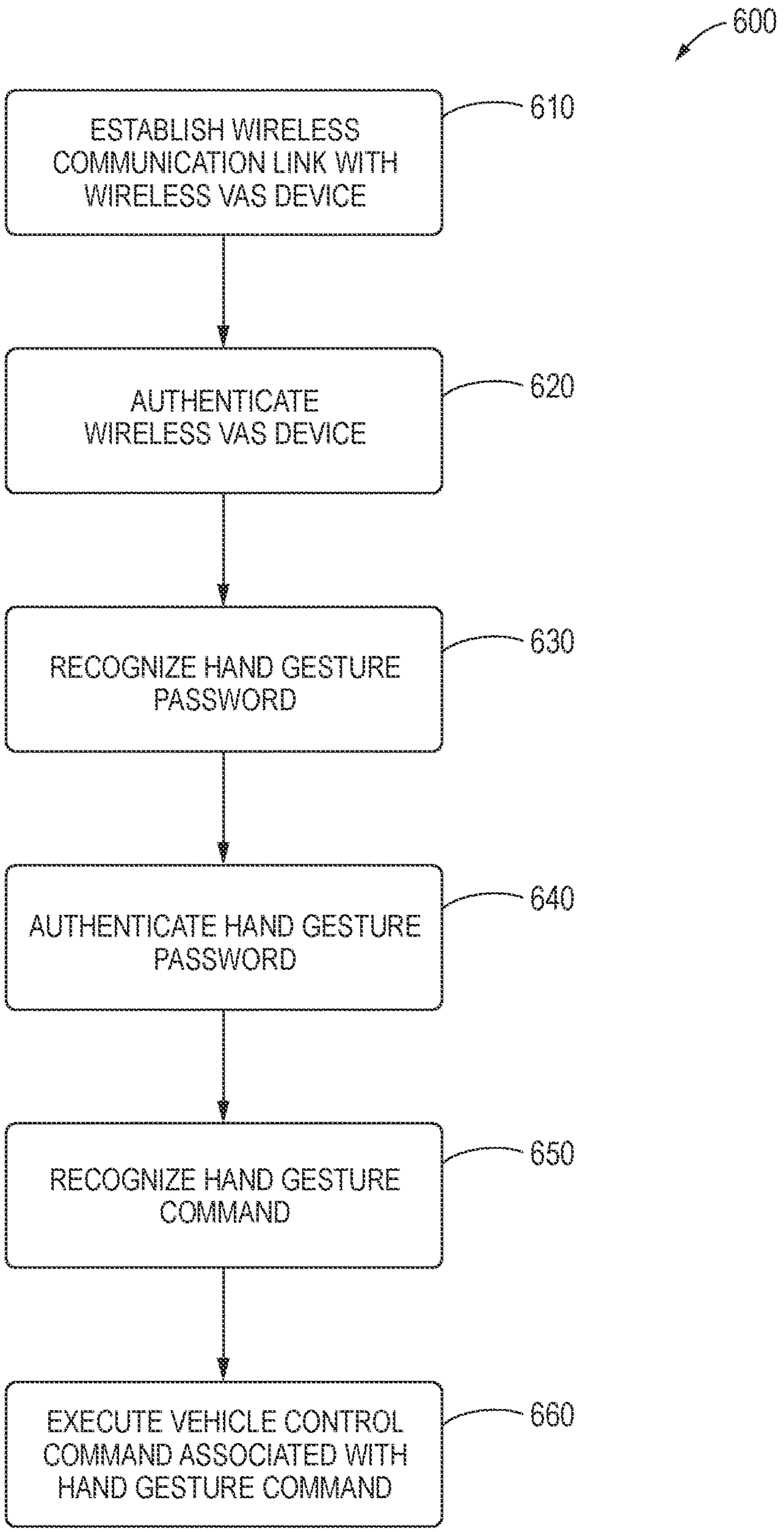
FIG. 6 depicts another flow chart representing functionality associated with vehicle access and remote control, in accordance with embodiments of the present disclosure.

FIG. 6 depicts another flow chart representing functionality associated with vehicle access and remote control, in accordance with embodiments of the present disclosure.

At 610, TCM ECU 240 establishes a wireless communication link with a wireless VAS device 190 carried (worn, etc.) by a user located proximate to vehicle 100, as discussed above. The wireless communication link may be a Bluetooth communication link, a UWB communication link, etc.

At 620, VAS ECU 270 authenticates the wireless VAS device 190, as discussed above.

For example, wireless VAS device 190 may transmit authentication data to TCM ECU 240, which sends the authentication data to VAS ECU 270. VAS ECU 270 then authenticates the wireless VAS device 190 based on the authentication data and an associated security protocol, such as public key infrastructure (PKI), etc.

At 630, VAS ECU 270 recognizes a hand gesture password performed by a user of the wireless VAS device 190, as discussed above.

At 640, VAS ECU 270 authenticates the hand gesture password based on a user profile associated with the wireless VAS device 190, as discussed above.

At 650, VAS ECU 270 recognizes a hand gesture command performed by the user, as discussed above.

At 660, VAS ECU 270 and the appropriate ECU 220 execute a vehicle control command associated with the hand gesture command, as discussed above.

For example, VAS ECU 270 may determine which vehicle control command is associated with the hand gesture command by searching the user profile based on the user ID. After the vehicle control command is determined from the user profile, VAS ECU 270 sends a command to the appropriate ECU 220 to execute the vehicle control command, such as a suspension command to BCM ECU 260 to lower the vehicle height for ease of cabin entry, an open frunk command to BCM ECU 260 to open the frunk, etc. The appropriate ECU 220 then executes the vehicle control command.

In certain embodiments, the vehicle control command may include lowering a suspension height, raising the suspension height, at least partially lowering one or more windows, at least partially raising one or more windows, turning on one or more interior cabin lights, turning off one or more interior cabin lights, turning on a cabin heating ventilation and air conditioning (HVAC) system, turning off the cabin HVAC system, turning on one or more exterior lights, turning off one or more exterior lights, locking at least one door, unlocking at least one door, opening a trunk, remote engine starting, arming the security system, disarming the security system, and activating a security system alarm.

In certain embodiments relating to electric vehicles, the vehicle control command may include starting charging when coupled to a charging station, stopping charging when coupled to the charging station, setting a charging limit when coupled to the charging station, turning on a thermal management system (TMS), turning off the TMS, and opening a frunk.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method for vehicle access and remote control, comprising:

establishing a wireless communication link with a wireless vehicle access system (VAS) device for a vehicle;

authenticating the wireless VAS device;

recognizing an initial hand gesture;

determining, based on a confidence measure value, that the initial hand gesture was correctly recognized;

determining that the correctly-recognized initial hand gesture is a hand gesture password performed by a user of the authenticated wireless VAS device;

authenticating the hand gesture password based on a user profile associated with the authenticated wireless VAS device;

after the hand gesture password is authenticated, recognizing a subsequent hand gesture;

determining, based on the confidence measure value, that the subsequent hand gesture was correctly recognized;

determining that the correctly-recognized subsequent hand gesture is a hand gesture command performed by the user of the authenticated wireless VAS device;

determining, based on the user profile, a vehicle control command associated with the hand gesture command; and executing the vehicle control command associated with the hand gesture command.

2. The method of claim 1, further comprising:

sending, over the wireless communication link, a first haptic command to the authenticated wireless VAS device in response to authenticating the hand gesture password.

3. The method of claim 2, further comprising:

sending, over the wireless communication link, a second haptic command to the authenticated wireless VAS device in response to recognizing the hand gesture command.

4. The method of claim 3, wherein the first haptic command and the second haptic command are different vibration commands.

5. The method of claim 1, wherein the hand gesture command includes a sequence of hand gestures.

6. The method of claim 5, wherein the sequence of hand gestures is performed by one hand.

7. The method of claim 6, wherein the sequence of hand gestures includes two circles sequentially formed in opposite directions.

8. The method of claim 1, wherein establishing the wireless communication link is performed within a device detection zone (DDZ).

9. The method of claim 8, wherein recognizing the hand gesture password is performed within a hand gesture detection zone (HGDZ).

10. The method of claim 9, wherein a near vehicle zone (NVZ) immediately surrounds the vehicle, the HGDZ surrounds the NVZ, and the DDZ surrounds the HGDZ.

11. The method of claim 10, wherein the DDZ and the HGDZ are determined by a Bluetooth received signal strength indicator (RSSI) from the wireless VAS device.

12. The method of claim 10, wherein the DDZ and the HGDZ are determined by an ultra wide band (UWB) signal Time-of-Flight (ToF) measured between the wireless VAS device and the vehicle.

13. The method of claim 1, wherein the vehicle control command includes: lowering a suspension height, raising the suspension height, at least partially lowering one or more windows, at least partially raising one or more windows, turning on one or more interior cabin lights, turning off one or more interior cabin lights, turning on a cabin heating ventilation and air conditioning (HVAC) system, turning off the cabin HVAC system, turning on one or more exterior lights, turning off one or more exterior lights, locking at least one door, unlocking at least one door, opening a trunk, remote engine starting, arming a security system, disarming the security system, and activating a security system alarm.

14. The method of claim 13, wherein the vehicle control command includes: starting charging when coupled to a charging station, stopping charging when coupled to the charging station, setting a charging limit when coupled to the charging station, turning on a thermal management system (TMS), turning off the TMS, and opening a frunk.

15. A vehicle, comprising:

two or more cameras configured to provide image data of zones surrounding the vehicle; and a vehicle control system, coupled to the cameras, the vehicle control system comprising:

a wireless transceiver configured to:

establish a wireless communication link with a wireless vehicle access system (VAS) device, and receive authentication data from the wireless VAS device; and one or more processors configured to:

authenticate the wireless VAS device based on the authentication data, recognize an initial hand gesture;

determine, based on a confidence measure value, that the initial hand gesture was correctly recognized;

determine that the correctly-recognized initial hand gesture is a hand gesture password performed by a user of the authenticated wireless VAS device, authenticate the hand gesture password based on a user profile associated with the authenticated wireless VAS device, after the hand gesture password is authenticated, recognize a subsequent hand gesture, determine, based on the confidence measure value, that the subsequent hand gesture was correctly recognized, determine that the correctly-recognized subsequent hand gesture is a hand gesture command performed by the user of the authenticated wireless VAS device, determine, based on the user profile, a vehicle control command associated with the hand gesture command, and execute the vehicle control command associated with the hand gesture command.

16. The vehicle of claim 15, wherein:

the one or more processors are further configured to:

generate a first haptic command in response to authenticating the hand gesture password, and generate a second haptic command in response to recognizing the hand gesture password, where the second haptic command is different than the first haptic command; and the wireless transceiver is further configured to transmit, over the wireless communication link, the first and second haptic commands to the authenticated wireless VAS device.

17. The vehicle of claim 15, wherein the hand gesture command includes a sequence of hand gestures.

18. The vehicle of claim 15, wherein:

the wireless communication link is established when the wireless VAS device is located within a device detection zone (DDZ);

the hand gesture password is recognized when the authenticated wireless VAS device is located within a hand gesture detection zone (HGDZ); and a near vehicle zone (NVZ) immediately surrounds the vehicle, the HGDZ surrounds the NVZ, and the DDZ surrounds the HGDZ.

19. The vehicle of claim 18, wherein the DDZ and the HGDZ are determined by a Bluetooth received signal strength indicator (RSSI) from the wireless VAS device.

20. The vehicle of claim 18, wherein the DDZ and the HGDZ are determined by an ultra wide band (UWB) signal Time-of-Flight (ToF) measured between the wireless VAS device and the vehicle.

* * * * *